United States Patent [19]

Jalan et al.

[11] 4,137,372

[45] Jan. 30, 1979

[54] CATALYST AND METHOD FOR MAKING

[75] Inventors: Vinod M. Jalan, Manchester; Calvin L. Bushnell, Glastonbury, both of Conn.

[73] Assignee: United Technologies Corporation, Hartford, Conn.

[21] Appl. No.: 854,284

[22] Filed: Nov. 23, 1977

[51] Int. Cl.$^2$ .................... B01J 21/18; B01J 23/42
[52] U.S. Cl. .................... 429/44; 252/425.3; 252/447
[58] Field of Search ............... 429/44, 45; 252/425.3, 252/447

[56] References Cited

U.S. PATENT DOCUMENTS

| | | | |
|---|---|---|---|
| 2,358,359 | 9/1944 | Stuart | 252/447 X |
| 3,311,505 | 3/1967 | Paget et al. | 429/45 |
| 3,881,957 | 5/1975 | Hausler | 429/44 X |
| 4,028,274 | 6/1977 | Kunz | 252/425.3 X |

*Primary Examiner*—Patrick Garvin
*Attorney, Agent, or Firm*—Stephen E. Revis

[57] ABSTRACT

The rate of platinum recrystallization of a platinum supported on carbon catalyst is reduced by depositing porous carbon on and around the supported platinum crystallites. The reduced rate of platinum recrystallization results in higher platinum surface areas over a period of time and therefore improves the performance of the catalyst. The porous carbon can be deposited by any suitable technique, a preferred method being to heat the supported platinum in the presence of carbon monoxide to decompose the carbon monoxide thereby depositing carbon on and around the platinum crystallites.

28 Claims, 1 Drawing Figure

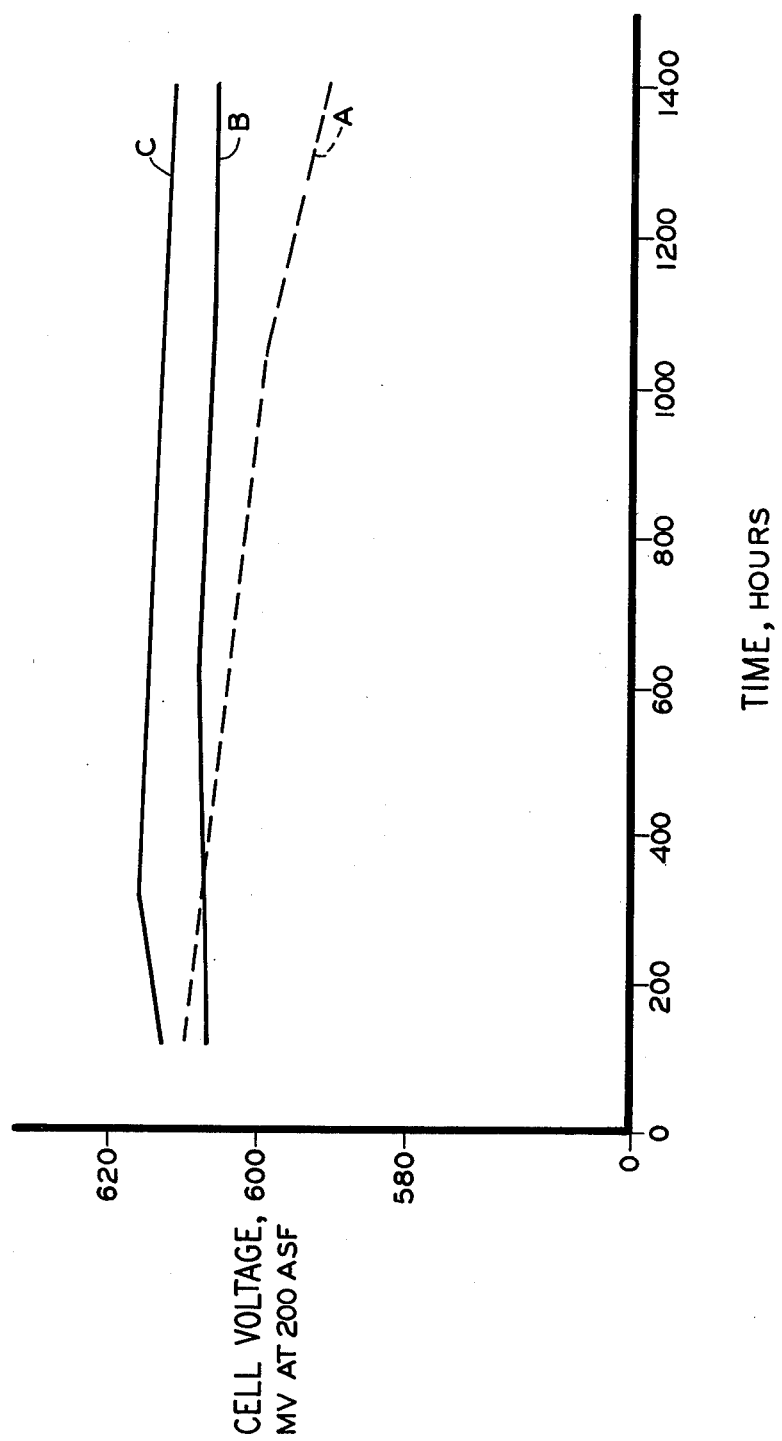

CATALYST AND METHOD FOR MAKING

RELATED APPLICATIONS

The following commonly owned applications were filed on even date with the present application and include related subject matter:

U.S. Ser. No. 854,283 entitled "Fuel Cell Electrode With Improved Catalyst" by V. Jalan and C. Bushnell, now abandoned;

U.S. Ser. No. 854,285 entitled "Improved Platinum Catalyst and Method for Making" by V. Jalan and C. Bushnell; and U.S. Ser. No. 854,286 entitled "Fuel Cell Electrode With Improved Platinum Catalyst" by V. Jalan and C. Bushnell, now abandoned.

BACKGROUND OF THE INVENTION

1. Field of the Invention

This invention relates to a platinum catalyst and more particularly to a platinum catalyst supported on carbon particles.

2. Description of the Prior Art

Platinum is a well-known catalyst used in electrochemical cells. Electrode performance in a cell is directly related to the amount of surface area of platinum which can be reached by the various reacting species within the cell. This fact, coupled with the high cost of platinum, has resulted in considerable effort to get platinum into a usable form which has maximum surface area per unit weight of platinum. The basic approach has been, and still is, to put the platinum on the surface of suitable particles called supports. Carbon particles and graphite particles are common platinum supports in the fuel cell art. Several known techniques exist for depositing small platinum particles on such supports. For example, the support can be dispersed in an aqueous solution of chloroplatinic acid, dried, and exposed to hydrogen. Some other techniques are described in U.S. Pat. Nos. 3,857,737 to Kemp et al, 3,440,107 to Barber, 3,470,019 to Steele, and 3,532,556 to Steele.

By these techniques platinum crystals may be dispersed on the surfaces of the support particles so as to provide a high surface area of platinum.

When carbon supported platinum is used at temperatures of greater than 100° C. in the presence of a liquid (or at higher temperatures in the presence of a gas) it has been found to lose surface area. This loss of surface area is particularly pronounced in an acid fuel cell environment, such as in fuel cells using phosphoric acid as the electrolyte, which operate at temperatures anywhere from 120° C. and higher. The loss in surface area is dramatic during the first few hours of cell operation, but it continues at a slow but steady rate for a considerable period thereafter. A loss in cell performance is directly attributable to this loss in platinum surface area.

One method for reducing this loss of surface area is described in commonly owned U.S. Pat. No. 4,028,274 to Harold R. Kunz. In that invention the surfaces of graphitized carbon support particles were oxidized in the presence of a metal oxidizing catalyst to form pits in the surfaces of the particles. The metal oxidizing catalyst was then removed and the platinum was deposited on the oxidized particles. Based on the theory that during use of the catalyst the platinum crystallites migrate over the surface of the carbon and combine with other platinum crystallites (i.e., recrystallizing) thereby losing surface area, it was felt that the pits in the surface of the support material would hold the platinum crystallites more securely in place thereby reducing migration and loss of surface area. While this method was an improvement over the prior art, it was not totally satisfactory and continued efforts have resulted in the improved method of the present invention.

SUMMARY OF THE INVENTION

Accordingly, it is an object of the present invention to make an improved platinum supported on carbon catalyst, and more particularly to make an improved fuel cell electrode using this catalyst.

Another object of the present invention is to reduce recrystallization of platinum supported on carbon by reducing the migration of the platinum over the surface of the carbon support particles during subsequent treatment of the catalyst such as during heating of the catalyst in the presence of a liquid or gas, or during subsequent use of the catalyst such as in a fuel cell.

According to the present invention a method for improving a catalyst of platinum crystallites supported on carbon comprises the step of depositing porous carbon on and around the supported platinum crystallites.

It has been found that a catalyst made by the methods described herein and used as the electrode catalyst in a phosphoric acid fuel cell has improved recrystallization properties in that the rate of loss of specific surface area during fuel cell operation is significantly reduced. It is believed that the porous carbon deposited on and around the platinum crystallites tends to more securely "set" the platinum crystallites in position on the carbon support particle thereby significantly reducing the crystallites' ability to migrate over the surface of the carbon support particle. By reducing the rate of migration the rate and extent to which recrystallization occurs is significantly reduced.

The method for depositing the carbon on and around the platinum crystallites does not appear to be critical to the present invention; however, a preferred method is to heat a supported platinum catalyst in the presence of carbon monoxide gas such that the carbon monoxide decomposes in the vicinity of the platinum crystallites (which act as a decomposition catalyst) to deposit carbon thereon and therearound. Other methods are hereinafter disclosed; but the carbon monoxide method is preferred because of its simplicity and low cost. Basically, all of the methods described herein involve heating the catalyst in the presence of a carbonaceous compound to decompose the compound thereby forming porous carbon deposits on and around the platinum crystallites. This does not mean, however, that other techniques for depositing carbon would not work.

The foregoing and other objects, features, and advantages of the present invention will become more apparent in the light of the following detailed description of preferred embodiments thereof as illustrated in the accompanying drawing.

BRIEF DESCRIPTION OF THE DRAWING

The sole FIGURE is a graph showing the improved fuel cell performance attained by using a catalyst made in accordance with the present invention.

DESCRIPTION OF THE PREFERRED EMBODIMENTS

In accordance with one preferred embodiment of the present invention, a catalyst comprising platinum particles or crystallites supported on carbon is heated to within the temperature range of 500° F. to 1200° F. in a carbon monoxide atmosphere. The platinum crystallites act as a catalyst to the decomposition of the carbon monoxide as represented by the following formula:

(1)

Since without the presence of platinum the carbon monoxide will not decompose within this temperature range, the carbon is only deposited on and around the platinum crystallites. The heat treatment temperature range is coordinated with the time that the catalyst is held within that temperature range to produce the best results. The critical considerations are to make sure that the carbon deposits are sufficiently heavy to significantly reduce platinum migration, while at the same time they are not so dense and thick such that during use of the catalyst the reactant gas and/or liquid cannot easily reach the platinum crystallites. In other words the carbon deposits must be porous such that the performance of the catalyst does not suffer to such an extent that the benefits of the present invention are nullified.

Since it was not possible to calculate the optimum thickness or porosity of the carbon being deposited, a number of catalyst samples were made using various temperatures and times. Electrodes were made with these samples using standard techniques. Table I below presents a sampling of the data obtained. The electrode performance data are from subscale cell tests using two inch by two inch cathodes with a catalyst loading of 0.25–0.50 mg/cm² of electrode surface. A conventional anode was used. The catalyst support material was a high surface area carbon black. The electrolyte in these tests was phosphoric acid and the reactants air and hydrogen.

TABLE I

Effect of CO Treatment Temperature and Time on Platinum Surface Area and Initial Performance in H₃PO₄ Fuel Cell

| Catalyst # | Treatment (temps are ± 25° F) | Initial Cathode Potential mv at 200 ASF | Pt Surface Area m²/gm | |
|---|---|---|---|---|
| | | | Initial | 100 hr |
| 1* | none | 680–687** | 120–140** | 40–50 |
| 2 | 5 min at 500° F | 682–691** | 139 | 46 |
| 3 | 10 min at 500° F | 680–691** | 125 | 53 |
| 4 | 15 min at 500° F | 685 | — | — |
| 5 | 60 min at 500° F | 686 | 113 | 51 |
| 6 | 60 min at 500° F | 686 | 120 | 62 |
| 7 | 5 min at 700° F | 687 | — | — |
| 8 | 10 min at 700° F | 695 | 131 | 64 |
| 9 | 10 min at 700° F | 695 | 131 | 66 |
| 10 | 15 min at 700° F | 683 | — | — |
| 11 | 30 min at 700° F | 678 | — | — |
| 12 | 5 min at 1500° F | 621 | — | — |

*Control catalyst—i.e., no CO treatment.
**Wherever a range is given it is the result of several tests using the same catalyst.

From these tests and other information relating to heat treatment of supported platinum catalyst, it is estimated that benefits will be observed if the heat treating temperature is within the range of 500° F. to 1200° F., and if the temperature is held within this range for from one to sixty minutes. Obviously, the higher the heat treating temperature, the shorter the time the temperature should be maintained, and vice versa. From past experience it is known that temperatures in excess of about 1200° F. result in excessive thermal sintering of the platinum during the heat treating. In other words, the high temperature in and of itself would cause significant migration of the platinum crystallites during the carbon monoxide treatment, resulting in an increase in platinum crystallite size which may eliminate any benefits which might otherwise have been obtained. A preferred heat treating temperature range is estimated to be 500° F. to 800° F., the temperature being held within the range for 5 to 30 minutes. Best results were obtained by heating to a maximum temperature of about 700° F. and holding at that temperature for about 10 minutes.

The drawing shows a graph wherein time in a fuel cell is plotted on the horizontal axis and fuel cell performance in terms of cell voltage is plotted on the vertical axis. The curves are plotted from actual data. The curve A is from a cell using untreated catalyst, such as catalyst #1 from Table I. The curves B and C are from cells using catalyst which had been carbon monoxide treated at 700° F. for 10 minutes. Note that although differences in initial performance were not meaningful, the treated catalysts were clearly superior over the long term as a result of smaller platinum surface area losses with time.

Carbonaceous gases or vapors other than carbon monoxide may also be used in practicing the present invention. For example, a hydrocarbon gas such as methane, acetylene or ethylene may be used as well as benzene, hexene, or heptane which should be used in the form of a vapor. The following formulas represent the reactions which occur for two of these materials:

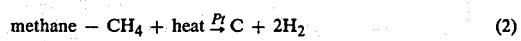
(2)

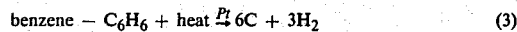
(3)

As with carbon monoxide, tests would have to be run for each gas to develop optimum heat treatment temperature ranges and the length of time that the temperature would have to be held within those ranges. A limited number of samples were made under a variety of conditions. Examples of some electrode test data using these samples is presented in Table II below. Electrode size, catalyst loading and other aspects of the fuel cell tests were the same as described above with regard to Table I.

TABLE II

Performance and Surface Area Data for Hydrocarbon Treated Catalyst

| Catalyst # | Treatment | Initial Cathode Potential mv at 200 ASF | Pt Surface Area m²/gm | |
|---|---|---|---|---|
| | | | Initial | 100 hr |
| 13* | none | 680–687** | 140 | 43 |
| 14 | Hexene, 5 min at 680° F | 672–683 | 133 | 54 |
| 15 | Benzene, 5 min at 800° F | 680 | — | — |

*Control catalyst—i.e., no treatment.
**Wherever a range is given it is the result of several tests using the same catalyst.

While these tests prove that the method of the present invention can be practiced with a variety of gases and vapors, not enough testing was done to develop preferred and optimum heat treatment conditions for these materials.

According to another embodiment of the present invention a carbon supported platinum catalyst was soaked for about 15-30 minutes in an aqueous solution of about 10 weight percent $C_{11}H_{22}O_{11}$ commonly known as sucrose. The catalyst was then dried at a low temperature to remove the water, leaving a coating of sucrose over the entire catalyst particle. The coated catalyst was then heated in an inert atmosphere (a vacuum could have been used) to decompose the sucrose according to the following formula:

$$C_{11}H_{22}O_{11} + heat \rightarrow 11C + 11H_2O \qquad (4)$$

This leaves porous carbon deposits over all areas of the catalyst including on and around the platinum crystallites as well as simply on the carbon support material. As in the other embodiments, the carbon which is deposited on or around the platinum crystallites serves the purpose of reducing migration of the platinum crystallites in accordance with the teachings of the present invention. Carbon which is deposited elsewhere on the support does no harm since the catalyst support material is already carbon. Table III displays test data for electrodes comprising catalyst made using the method of this embodiment. Electrode size, catalyst loading and other aspects of the fuel cell tests were the same as described above with regard to Table I.

TABLE III

Performance and Surface Area Data for Sucrose Treated Catalyst

| Catalyst # | Treatment | Initial Cathode Potential mv at 200 ASF | Pt Surface Area $m^2/gm$ | | |
|---|---|---|---|---|---|
| | | | Initial | 100 hr | 400 hr |
| 16* | none | 685 | 140 | 56 | 43 |
| 17 | 30 min at 920° F | 685 | 110 | 70 | 58 |
| 18 | 30 min at 1100° F | 681 | — | — | — |

*Control catalyst--i.e., No treatment.

For benefits to be observed it is estimated that the catalyst heat treatment temperature should be between 800° F. and 1200° F. and that the temperature should be held within this range for from one-half to six hours. In general the temperature need only be maintained until all of the sucrose is converted to carbon. As the carbon is being deposited, if the temperature exceeds 1200° F., excessive thermal sintering of the platinum during the sucrose decomposition step may occur and defeat the purpose of the present invention, which is to maintain small platinum crystallite sizes. Temperatures less than 800° F. will not completely carbonize the sucrose. It is believed that any soluble organic material which will decompose to carbon upon heating may be used for the purpose of practicing the present invention. Sucrose is one such soluble organic material. Examples of others are cellulose, phenolic resins, and polyvinyl alcohol.

Although the invention has been shown and described with respect to preferred embodiments thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the United States is:

1. A method for improving a catalyst of platinum crystallites supported on carbon comprising the step of depositing porous carbon on and around the supported platinum crystallites.

2. The method according to claim 1 wherein said step of depositing includes heating the catalyst in the presence of a carbonaceous compound to decompose said compound to form porous carbon.

3. The method according to claim 2 wherein said carbonaceous compound is in the form of a gas or vapor and said catalyst is heated in the presence of said gas or vapor.

4. The method according to claim 3 wherein said carbonaceous compound is carbon monoxide.

5. The method according to claim 4 wherein said step of heating includes heating to within the temperature range of 500° F. to 1200° F. and holding the temperature within said range for one to sixty minutes.

6. The method according to claim 5 wherein said temperature range is 500° F. to 800° F. and the temperature is held within said range for five to thirty minutes.

7. The method according to claim 4 wherein said step of heating includes heating to a maximum temperature of about 700° F. and holding said maximum temperature for about ten minutes.

8. The method according to claim 3 wherein said carbonaceous compound is a hydrocarbon vapor or gas, and said step of heating includes heating to a temperature sufficiently high to decompose the hydrocarbon to deposit porous carbon on and around the platinum crystallites.

9. The method according to claim 8 wherein said hydrocarbon is selected from the group consisting of n-hexene, heptane, benzene, acetylene, methane or ethylene.

10. The method according to claim 2 wherein said carbonaceous material is a soluble organic material and said step of depositing carbon includes applying a layer of said soluble organic material on the catalyst and then heating the catalyst in an inert atmosphere or vacuum to decompose the organic material in said layer leaving porous carbon on and around the platinum crystallites.

11. The method according to claim 10 wherein the step of applying a layer of soluble organic material comprises soaking said catalyst in an aqueous solution of said organic material and drying the catalyst to remove the water from the layer.

12. The method according to claim 2 wherein said carbonaceous material is sucrose.

13. The method according to claim 11 wherein said soluble organic material is sucrose.

14. The method according to claim 13 wherein said step of heating includes heating to within the temperature range of 800° F. to 1200° F. and holding the temperature within said range for one-half to six hours.

15. An improved catalyst comprising platinum crystallites supported on carbon particles, porous carbon having been deposited on and around said crystallites to reduce migration of said crystallites on the surface of said carbon particles during subsequent treatment or use of said catalyst.

16. The improved catalyst according to claim 15 wherein said deposited carbon was applied by heating the catalyst without the porous carbon deposits in the presence of a carbonaceous compound which decomposed to form said porous carbon deposits on and around said platinum crystallites.

17. The improved catalyst according to claim 16 wherein said carbonaceous compound was carbon monoxide gas.

18. The improved catalyst according to claim 16 wherein said carbonaceous compound was a hydrocarbon vapor or gas.

19. The improved catalyst according to claim 16 wherein said carbonaceous compound was sucrose.

20. A fuel cell electrode including an improved catalyst comprising platinum crystallites supported on carbon particles, said crystallites having porous carbon deposited thereon and therearound.

21. The electrode according to claim 20 wherein said deposited porous carbon was applied by heating the catalyst without the porous carbon deposits in the presence of a carbonaceous compound which decomposed to form said porous carbon deposits on and around said platinum crystallites.

22. The electrode according to claim 20 wherein said deposited porous carbon was applied by heating the catalyst without the porous carbon deposits in the presence of carbon monoxide gas to within the temperature range of 500° F. to 1200° F. and holding the temperature within said range for one to sixty minutes.

23. The electrode according to claim 20 wherein said deposited porous carbon was applied by heating the catalyst without the porous carbon deposits in the presence of carbon monoxide gas to within the temperature range of 500° F. to 800° F. and holding the temperature within said range for five to thirty minutes.

24. The electrode according to claim 20 wherein said deposited porous carbon was applied by heating the catalyst without the porous carbon deposits in the presence of carbon monoxide gas to a maximum temperature of about 700° F. and holding said maximum temperature for about ten minutes.

25. The fuel cell electrode according to claim 20 wherein said deposited porous carbon was applied by applying a layer of a soluble organic material on the catalyst without the porous carbon deposits, and heating said catalyst in an inert atmosphere or vacuum to decompose the organic material in said layer leaving said porous carbon deposits on and around said platinum crystallites.

26. The electrode according to claim 25 wherein said soluble organic material was sucrose.

27. The electrode according to claim 25 wherein said heating of the catalyst in an inert atmosphere or vacuum included heating to within the temperature range of 800° F. to 1200° F. and holding the temperature within said range for one-half to six hours.

28. The electrode according to claim 20 wherein said deposited porous carbon was applied by heating the catalyst without the porous carbon deposits in the presence of a hydrocarbon gas or vapor which decomposed to form said porous carbon deposits on and around said platinum crystallites.

* * * * *